Figure 5:
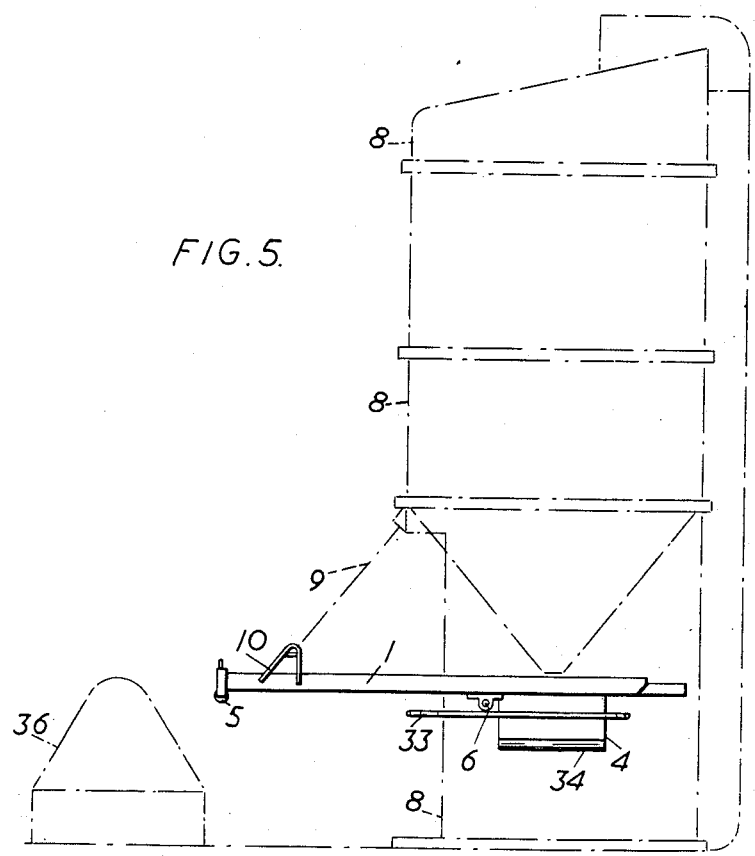

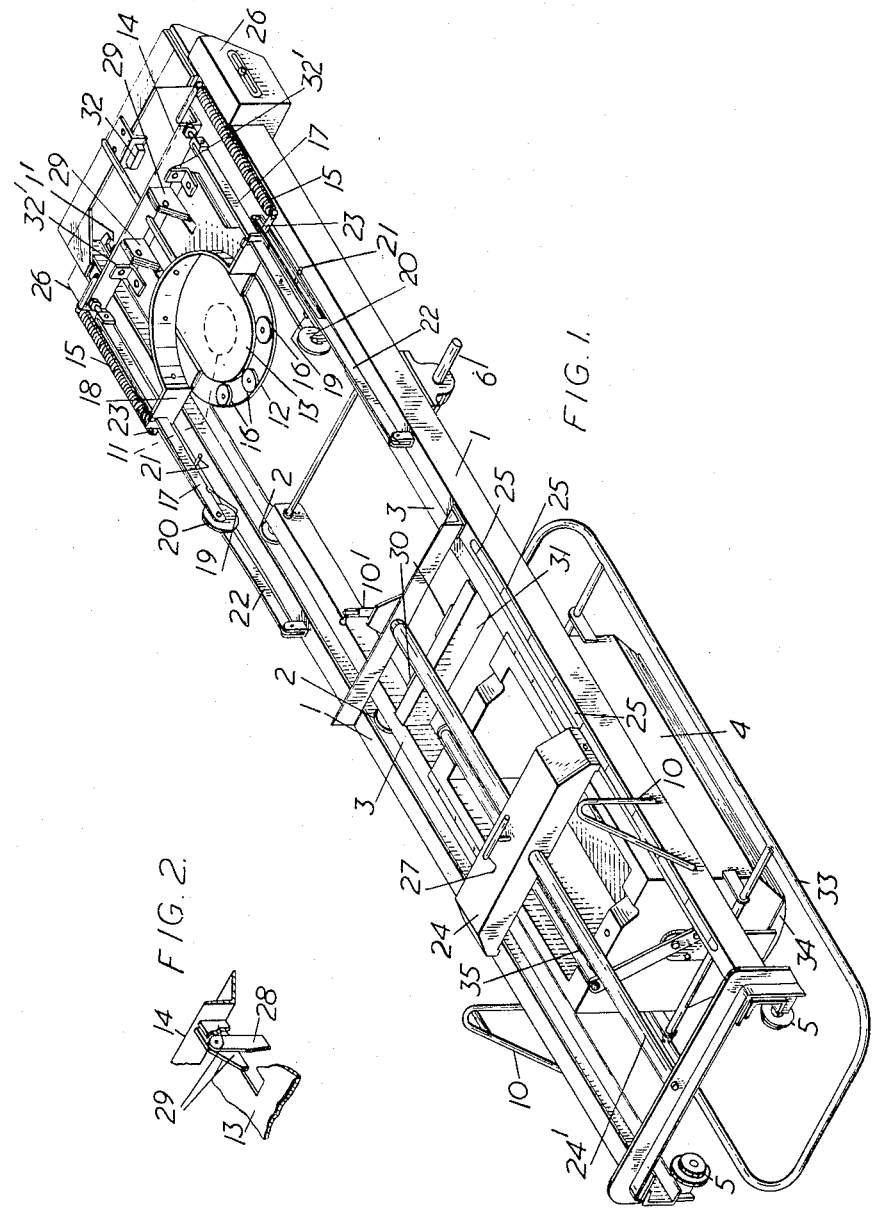

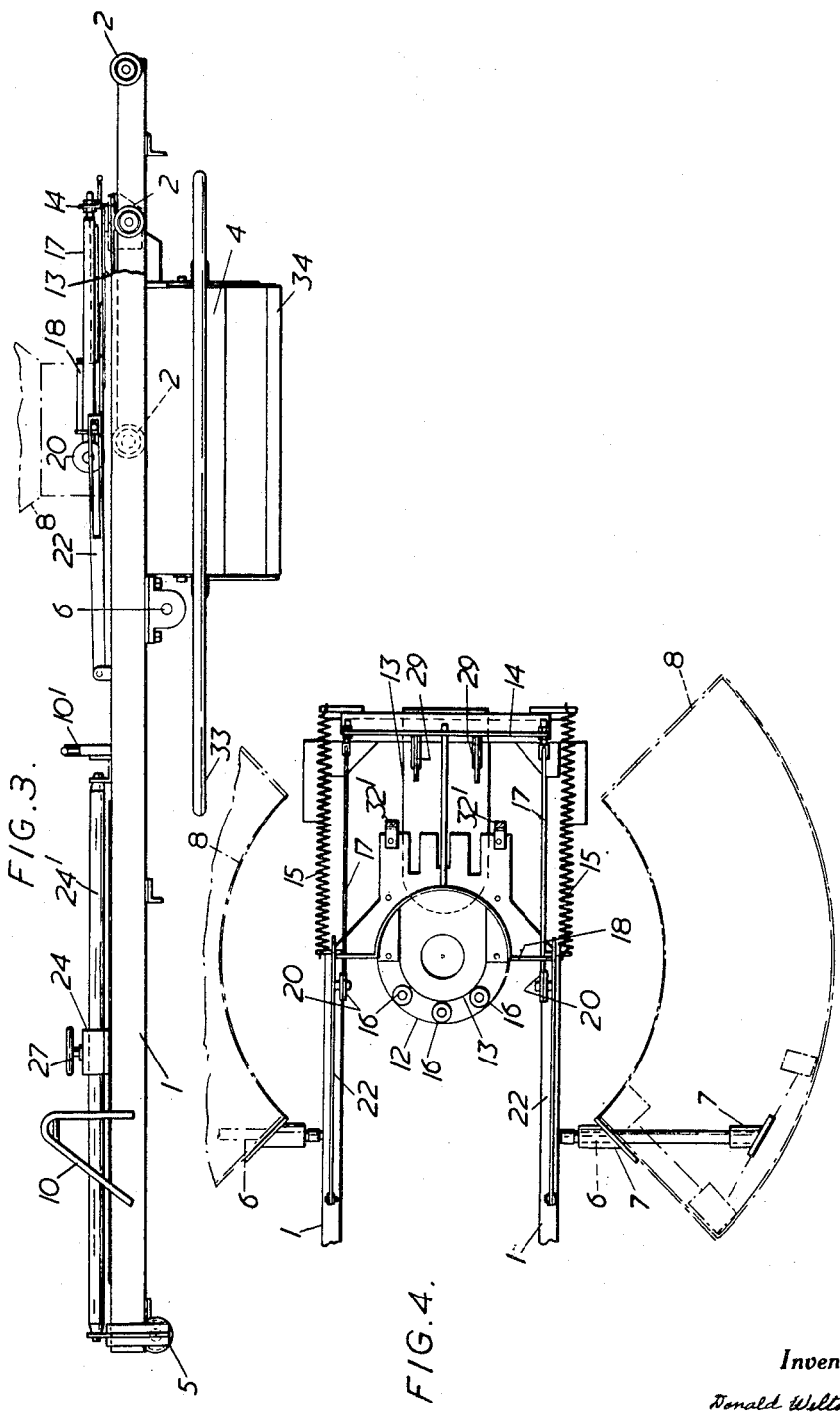

United States Patent Office 2,749,076
Patented June 5, 1956

2,749,076

MEASURING AND DELIVERING APPARATUS AND SILOS AND OTHER CONTAINERS INCORPORATING SUCH APPARATUS

Donald Welton Shepherd, York, England, assignor to Portasilo Limited, York, Yorkshire, England, a company of Great Britain Application July 2, 1954, Serial No. 440,976

Claims priority, application Great Britain July 6, 1953

13 Claims. (Cl. 249—2)

This invention is concerned with improvements in or relating to measuring and delivery apparatus and silos or other containers incorporating such apparatus.

It is frequently desired to transfer granular, powdery or other flowable material from a silo or other storage container to a site where such material is required for use or to other equipment for which the material is required or in which such material is to be treated, such site or equipment being hereinafter referred to generically as a "desired delivery point." It will be readily appreciated that the manual transportation of material from a storage container to a desired delivery point for instance in wheelbarrows, is uneconomic in terms of labour costs particularly if, as is frequently the case, it is desired to deliver predetermined amounts of material.

One of the objects of the present invention is to provide simple and efficient mechanism with the aid of which predetermined quantities of materials, can be transported from a storage container to a desired delivery point.

According to one aspect of the present invention there is provided measuring and delivery apparatus comprising a main frame mounted for pivotal movement about a horizontal axis and adapted in use to extend from the location of the zone for receiving the material to be transported to the location of the desired delivery point, a hopper or a sub-frame for carrying a hopper mounted for longitudinal movement along said main frame, and provision for applying a counterweight or its equivalent to said main frame at a point intermediate the pivotal axis of the main frame and the delivery end thereof, the arrangement being such that when the equipment is in use and the hopper is empty the main frame swings in a direction elevating the receiving end thereof to a limiting position and remains in that position even when the hopper is moved into its receiving position, but upon the hopper becoming charged with the predetermined amount of material the said main frame swings in a direction lowering its receiving end.

The present invention also resides in a silo or other storage container in conjunction with measuring and delivering apparatus as above defined connected thereto and adapted to be moved from a longitudinally extending position for use into a position nested against the said silo or other container for storage or transport purposes.

The aforesaid hopper is preferably so disposed as to be movable to a position in which it overhangs the main frame at the receiving end of such frame so as to facilitate the locating of such hopper under the discharge outlet of a silo or other storage container and so as to enable the main frame to be swung upwardly for nesting purposes without its receiving end fouling any part of the said silo or other storage container.

The aforesaid connection between the measuring and delivery apparatus and the silo or ther container is preferably of a pivotal nature. Thus for instance the axis about which the aforesaid main frame is pivotably mounted may also be the axis about which the main frame can be swung into and from its operative and nested positions. It is however also within the scope of the present invention pivotally to mount the main frame in a carriage consisting for instance of triangular side plates and complementary cross-members and to mount such carriage on the silo or other container for pivotal movement about an axis which is parallel to but not co-incident with the axis about which the main frame pivots with respect to the carriage, the latter arrangement being in some respects preferable as the carriage can take a bearing on the base of the silo thus avoiding the whole weight being taken by stub shafts journalled in the silo body, and, moreover, it makes it possible for the pivotal axis of the main frame to be advanced forwardly of the silo so increasing the rigidity of the mounting particularly in the sense that the length of the main frame extending from the pivotal axis to the delivery end of the mechanism can be reduced without any corresponding reduction in the distance between such delivery end and the said silo or other container. In cases where there is provision for the said carriage taking a bearing on the base of the silo the connection preferably takes the form of apertured lugs for receiving withdrawable pins which also pass through apertures in the sides of the carriage, it being necessary of course to withdraw such pins before the main frame can be swung into its nested position.

Whilst the aforesaid hopper may be mounted directly on the main frame it is preferred to provide a sub-frame for longitudinal movement along the main frame and to secure the hopper to such sub-frame.

The main frame may be built up from two channel-sectioned longitudinal members with their channels inwardly directed in conjunction with appropriate stiffening members extending across the upper flanges of said longitudinal members, and bogies may extend from the sub-frame into the channels of the main frame. It is however also within the scope of the present invention to provide separate rails for engagement by the said bogies e. g. rails secured to but spaced from the longitudinal members of the main frame, and in such cases the said sub-frame is preferably provided with pairs of bogies for engaging the upper and lower surfaces of the rails so as to prevent the sub-frame from leaving the main frame. In yet another arrangement the longitudinal members of the main frame may be in the form of bars for instance of elliptical cross section and the said sub-frame may again be provided with bogies for engaging the upper and lower surfaces of such bars.

For the purpose of determining the amount of material which has to be fed into the said hopper in order to effect tilting of the main frame—which tilting is intended to be an indication that the required amount of material has been delivered—counter-weights may be applied directly to the main frame or to a bar secured thereto. The zone through which such counter-weights can be moved may of course be graduated so that an operator can easily position such weights so as to result in tilting of the frame pursuant to any required weight of material being supplied into the hopper. As an alternative to applying weights to the frame itself a link system may be pivotally coupled to the frame and weights may be applied to such link system. In all cases set screws or other devices may be provided for enabling the counter-weights to be secured in desired positions.

The aforesaid hopper may be of various kinds. Thus for instance it may be of unitary form and be adapted for being swung bodily about a horizontal axis when it is desired to discharge the contents of such hopper, or such hopper may be in two parts which are hingedly interconnected and discharge may be effected either by swinging one part of the hopper away from the other one or by swinging both parts of the hopper away from one another. In yet another arrangement the base portion of the hopper may be swingable with respect to the rest of the hopper so as to expose or cover a discharge aperture at will.

Any suitable handle may be fitted to the movable part of the aforesaid hopper for the purpose of facilitating the discharge operation. Thus for instance a substantially U-shaped handle may be provided, the limbs of said handle being adapted to straddle the hopper and to be detachably secured to the movable part of the hopper. If desired such handle may be securable to the movable part of the hopper in two positions so as to enable the hopper to be actuated from the right-hand or left-hand of the apparatus at will.

Any suitable means such as check rollers may be provided for preventing undesirable tilting of the aforesaid hopper, for instance when the hopper is moved to its delivery point in which position it advantageously projects beyond the aforesaid main frame.

The aforesaid hopper, or the sub-frame carrying such hopper, may be adapted to cause opening of the outlet valve of a silo or other container when such hopper is moved into its receiving position under such valve, and means may further be provided for shutting such outlet valve as soon as the said hopper becomes depressed as a result of a predetermined amount of material being fed into such hopper. The particular form of mechanism employed for bringing about such automatic operation of an outlet valve pursuant to movements of the hopper may be of various different kinds, and its type will to some extent depend upon whether the valve is of a slidable or rotary nature.

In cases where measuring and delivery apparatus in accordance with the present invention is coupled to a silo or other storage container, and particularly in cases where such apparatus is supported by a pivotal connection with the said silo or other container but has no connection with the base of such silo, it may be desirable to provide some form of support additional to that afforded by the said pivotal mounting. Such additional support may for instance take the form of stays extending between the above mentioned main frame and the said silo or other container but any such stays must of course provide accommodation for the required rocking movement of the main frame. It is accordingly preferred to provide stays in the form either of chains or of cables, e. g. stranded wire cables, anchored to appropriate parts of the said main frame and silo or other container. This arrangement offers the further advantage that no disconnection of the stays is necessary even in cases where the main frame can be swung from an operative position into a nested position.

Whilst measuring and delivery apparatus in accordance with the present invention is particularly intended for use in conjunction with a silo constructed in accordance with the invention forming the subject of my copending application Serial No. 433,749, filed June 1, 1954, for instance for the purpose of enabling measured quantities of cement to be quickly and easily extracted from the silo and delivered directly into a concrete mixer or other apparatus, it is to be understood that it may be associated with other forms of silos or storage containers and be adapted for dealing with materials other than cement.

In cases however, where the invention takes the form of a silo in accordance with the abovementioned patent application and pivotally connected weighing and delivery apparatus as hereinbefore described, the main frame of the weighing and delivery apparatus should be disposed on that side of the silo which is opposite to the keel of such silo, so that when the weighing and delivery apparatus is up-turned to nest against the adjacent side of the silo and such silo is turned onto its keel, e. g. for transport purposes, the said weighing and delivery apparatus is disposed on top of the said silo.

In cases where the aforesaid main frame is disposed for being swung into operative and nested positions with respect to a silo or other container any suitable means may of course be provided for locking it in its nested position and for limiting the extent to which it can swing downwardly towards its operative position. Thus for instance pins may be provided for passage through the main frame or through lugs projecting therefrom and through appropriate parts of the silo or other container, and in cases where the said main frame is pivotally mounted on a carriage which is connected to the base of the silo or other container when the apparatus is in its operative position and the said base connection has to be freed for enabling the frame to be moved to its nested position, it is advantageous for such base connections to be effected by means of pins which upon being extracted to allow the main frame to be up-turned serve as the pins for locking such frame to the carriage in its nested condition.

Measuring and delivery apparatus in accordance with the present invention may include any desired stops, adjustable or otherwise, for defining the receiving and/or delivery stations of the aforesaid hopper and if desired means may be provided for automatically tilting or opening the hopper and effecting discharge of its contents when such hopper reaches its delivery station. Thus for instance the hopper may be of a kind which tends to move into a discharging condition under gravity but is normally prevented from movement to that condition by trip mechanism which is freed by cooperation with a striker when the hopper reaches the said delivery station. In such an arrangement and assuming that the apparatus also includes the above described provision for automatic actuation of the outlet valve from the silo or other storage container, the whole operation of extracting a given weight of material from such silo or other storage container and delivering it to a desired delivery point can be effected by the mere travel of the hopper between its receiving and discharging zones.

Figure 6:
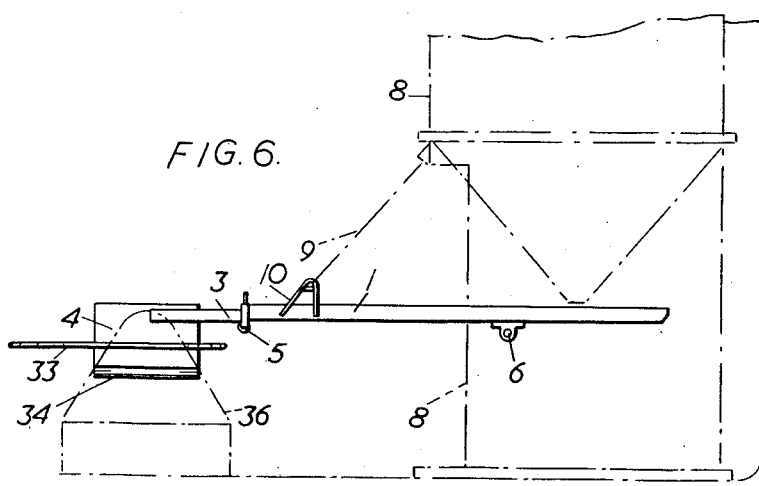
Figure 7:
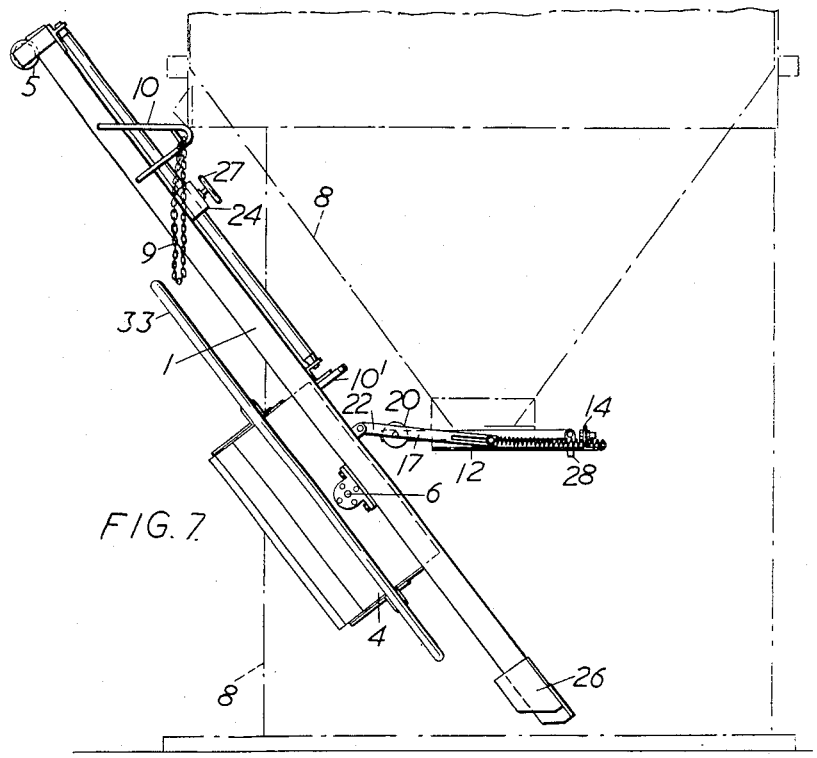
Figure 8:
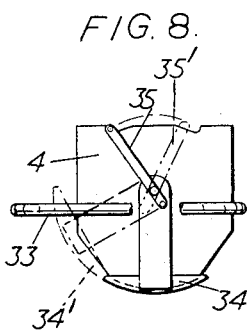
Figure 9:
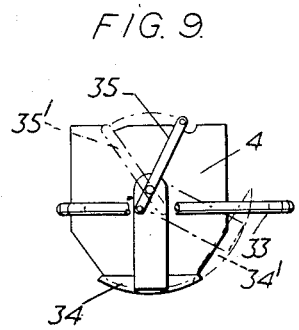

In order that the present invention may be well understood one embodiment thereof in application to a silo of the kind forming the subject of my co-pending patent application Serial No. 433,749, filed June 1, 1954, will now be described by way of example only and with reference to the accompanying drawings in which:

Figure 1 is a perspective view of the measuring and delivering apparatus,

Figure 2 is an enlarged perspective view of a detail of the apparatus shown in Figure 1, Figure 3 is a side view of the said apparatus drawn on a smaller scale and showing the hopper in its receiving position, an adjacent part of an associated silo being shown in chain lines, Figure 4 is a plan view of a part of the right-hand portion of the apparatus shown in Figure 3, part of an associated silo to which the apparatus is attached being shown in chain lines, Figure 5 is a side elevation showing diagrammatically the application of the delivering apparatus to a silo, the silo being shown in chain lines and the hopper of a mixer into which it is desired to feed cement from the silo also being shown in chain lines, Figure 6 is a view similar to that of Figure 5 but showing the hopper of the delivery apparatus in its delivery position, Figure 7 again shows a part of the silo in chain lines but the delivery apparatus is shown in its nested position, Figure 8 is an end view of the hopper of the delivery apparatus with the handle set in the position for opening the hopper by movement in one direction and Figure 9 is a view similar to that of Figure 8 but with the handle positioned for opening movement in the opposite direction.

Referring to the drawings, the main frame of the delivery appartus comprises two channel-sectioned longitudinal members 1, 1, having their channels inwardly directed in conjunction with transverse members. The channels of the members 1, 1, form runways for bogies 2 extending laterally from a sub-frame 3 which is again built up from longitudinal and transverse members.

The hopper 4 of the delivery apparatus hangs from the aforesaid sub-frame 3 and is longitudinally movable with that sub-frame from a receiving position, shown in Figure 5 to a discharging position shown in Figure 6. In the latter position the sub-frame 3 projects beyond the main frame and in order to resist the resultant tendency for such sub-frame to tilt, check rollers are provided, e. g. the check rollers, 5, 5, shown in the drawings and disposed on the main frame for engagement with the under surfaces of the longitudinal members of the said sub-frame 3.

The main frame is provided with trunnions 6, 6, extending from pedestals secured to the members 1, 1, of the said main frame and these bearings are received within bearing members 7, mounted on the silo structure, parts of such structure being shown in chain lines in Figures 3, 4, 5, 6 and 7 and generally designated by numeral 8. The aforesaid main frame is accordingly swingable from the horizontally extending position shown in Figures 3, 5 and 6 into the nested position shown in Figure 7. In order to support the main frame in its horizontally extending position chains 9 extend from brackets 10 located near the forward end of the main frame to anchorage points on the silo, and in order to lock the main frame in its nested position pins may be passed through the said brackets 10 into the said anchorage points on the silo, or independent securing means such for instance as the stowage bolt shown in the drawings and designated 10' may be provided.

When the aforesaid hopper 4 is in its receiving zone, e. g. the position shown in Figures 3 and 4, it is located under the discharge outlet of the silo 8 (the relative position of such outlet with respect to the delivery apparatus being designated by the chain line circle 11 in Figure 1) and valve mechanism is disposed on the said apparatus for co-operation with the silo outlet. Such valve mechanism comprises an apertured base plate 12 which is secured to the outlet of the silo 8 and a relatively movable assembly including a valve plate 13 which can be reciprocated to cover and uncover the silo outlet at will.

For the purpose of ensuring that when the hopper is propelled inwardly it is automatically brought into a position disposed centrally with respect to the silo discharge outlet, splayed slots may be formed in the bottom flanges of the main channel members 1, 1, for engagement by the two central bogies 2 of the sub-frame 3 when the said central position is reached, one of such slots being shown in Figure 1 and designated 1'.

The valve plate 13 is secured to a transversely extending angle member 14 disposed for reciprocation with the said plate, and tension springs 15, 15, are secured at their rear ends to said angle member and at their forward ends to projections extending from the valve base plate assembly 12, the arrangement being such that the valve plate 13 is normally urged to its fully closed position abutting against stops e. g. the stops designated 16 in the drawings.

Pivotally mounted on the aforesaid angle member 14 are two primary arms 17, 17, the medial parts of which are slidably received within slots in a bracket member 18 extending upwardly from the above-mentioned valve base assembly 12. These primary arms 17, 17, are provided with slots 19 which are so disposed that when the angle member 14 and with it the valve plate 13 are moved to the valve-opened condition such slots drop into locking engagement with the roots of the aforesaid slots in the bracket 18 thereby trapping the valve in its opened condition.

The forward ends of the aforesaid primary arms 17, 17 are provided with cam elements 20, 20, such cams being disposed for cooperation, in a manner hereinafter described, with pins 21, 21, extending from secondary arms 22, 22. The said secondary arms 22, 22 are pivotally mounted on the main frame 1 of the apparatus at their forward ends and their rear ends are provided with slots which embrace pins 23, 23, extending from the bracket 18 and forming the aforesaid anchorage points for the forward ends of the springs 15, 15.

It will be observed from an examination of Figure 7 of the drawings that when the main frame of the apparatus is turned to its nested condition the above described valve assembly remains attached to the silo outlet and the requisite relative movement between that assembly and the main frame of the delivery apparatus is readily accommodated by virtue of the combination of the pivotal connection between the secondary arms 22 and the main frame and the pin and slot connection between those arms and the valve assembly.

A counter-weight 24 is located on the forward part of the main frame of the apparatus and is longitudinally slidable along the bar 24', the function of such counter-weight being to maintain such main frame in a position rotated to a limiting position in an anti-clockwise direction as viewed in Figure 1 until such time as the hopper 4 is in its receiving position and charged with a required quantity of material from the associated silo whereupon the frame is caused to rock in a direction slightly lowering the inner end of the frame. In order to facilitate the setting of the counter-weight 24 in positions appropriate for bringing about the aforesaid tilting of the main frame pursuant to various amounts of material being fed into the hopper a graduated scale 25 may be provided on the main frame 1 in the zone of movement of the said counter-weight. In order to facilitate accurate setting of the apparatus, adjustable weights 26 may be fitted to the inner end of the main frame or any other provision for finely adjusting the balance of the main frame may be provided.

It is of course necessary to provide for locking the counter-weight 24 in a desired position of adjustment and for this purpose a clamping screw 27 may be provided.

For the purpose of effecting automatic opening of the valve 13 pursuant to movement of the empty hopper 4 into its receiving position catch levers 28, 28 pivotally depend from brackets 29, 29 secured to the aforesaid angle member 14 so as to be reciprocable with the valve plate 13 and such catch levers cooperate with stop pads 30, 30 located on a transverse member 31 of the sub-frame carrying the said hopper the arrangement being such that pursuant to inward movement of the hopper the stop pads engage the catch levers and so cause the valve plate 13 to move in unison with the hopper until such time as the slots 19 in the primary arms 17 come into registration with the slots in the brackets 18 whereupon the valve is trapped in its opened position. When however an amount of material determined by the setting of the counter-weight 24 has been fed into the hopper and the main frame of the apparatus accordingly tilts in a direction lowering its inner end there is relative upward movement of the pins 21 with respect to the cams 20 with the result that the interengagement between the primary arms 17 and the slots in the bracket 18 is freed and the valve is automatically closed under the influence of the above-mentioned springs 15.

The aforesaid relative movement between the cams 20 and pins 21 is due to the pivotal axis of the secondary arms 22 being located in front of the trunnions 6, i. e. the pivotal axis of the secondary arm swings in a radius about the trunnions when the receiving end of the mechanism is lowered so moving the said pivotal axis upwardly and inwardly and also moving the pins 21 upwardly and inwardly with respect to the cams 20.

It is preferable to provide an independent buffer for defining the innermost position of the movable part of the above described valve assembly and for this purpose a rear buffer stop 32 may be fitted to a transverse member of the main frame for cooperation with the angle member 14. If desired independent buffer stops 32' may be fitted for cooperation with the angle member 14 in defining the inner limiting position of the valve.

The hopper 4 is provided with a handle 33 for the purpose of facilitating its manipulation from and to its receiving and discharging positions and in order to facilitate manipulation from either side of the apparatus such handle may be of hoop like form and be transversely slidable with respect to the hopper so that it can be caused to project on either side, it being shown projecting on the right-hand side in Figures 1 and 9 and on the left-hand side in Figure 8.

The aforesaid hopper has a swingable base portion 34 for covering or uncovering a discharge opening at will and a handle 35 is provided for facilitating the manipulation of such base portion. In order to enable the hopper to be easily opened or closed from either the right-hand or left-hand side of the apparatus, such handle is preferably fixable in a selected one of two positions, i. e. the position shown in Figures 1 and 9 for actuating the hopper from the right-hand side of the apparatus or the position shown in Figure 8 for actuating the hopper from the left-hand side of the apparatus. In Figures 8 and 9 the movable base of the hopper and the handle are shown in the closed positions in full lines and in the open positions in chain lines designated 34' and 35' respectively.

When the above described equipment is in use a collector for the cement delivered from the silo, e. g. the hopper of a cement mixer, such hopper being shown in chain lines in Figures 5 and 6 and designated by numeral 36, may be disposed for being swung into a position immediately under that occupied by the hopper 4 when the latter is in its discharging position. Assuming that the counter-weight 24 has been set to correspond to the desired weight of cement to be delivered the operation of the above equipment is as follows:

An operator grasps the handle 33 and moves the hopper 4 to its innermost position, i. e. the position shown in Figure 3, thus striking the catch lever 28 and causing the valve plate 13 to move to its opened position against the action of the springs 15, the valve plate being trapped in the open position by virtue of the slots in the primary arms 17 engaging the bracket 18. During this stage of the operation the main frame of the apparatus is maintained in a substantially horizontal position and rocked to a limiting position in an anti-clockwise direction as viewed in Figures 1, 5 and 6. When however the amount of cement fed into the hopper 4 overcomes the influence of the counter-weight 24 the main frame rocks in a clockwise direction so automatically freeing the primary arms 17 whereupon the valve 24 closes and cuts off the flow of cement into the hopper 4. The operator then grasps the handle 33 and moves the hopper to its delivery zone, i. e. the position shown in Figure 6 and he then swings the handle 35 into a position opening the base of the hopper and allowing the cement to fall into an already positioned hopper 36 of a cement mixer.

Whilst one embodiment of the present invention has been hereinbefore described it is to be understood that there may be various changes without departing from the scope of such invention. Thus for instance the valve may be of a rotary nature and the automatic release of the valve pursuant to a predetermined amount of material being fed into the delivery apparatus may be of various kinds other than that specifically described.

I claim:

1. Apparatus for receiving a pre-determined amount of powdery material such as cement from a receiving zone and enabling such material to be conveyed for discharge at a delivery zone, said apparatus comprising a main frame, means mounting said frame intermediate its ends for pivotal movement about a horizontal axis, said frame extending from said receiving zone to said delivery zone, a hopper mounted on said frame for movement back and forth along the same between said receiving zone and said delivery zone, counter-weight means on said frame at the side of said pivot axis in the direction of said delivery zone for counterbalancing the weight of said hopper when at said receiving zone so that said main frame is tilted in a direction urging said hopper upwardly when said hopper is empty, the weight of said hopper when charged with a pre-determined amount of the material effecting tilting of said frame in the opposite direction, a valve at said receiving zone for controlling flow of material into said hopper, means biasing said valve towards a closed position, means actuated by said hopper upon movement thereof to said receiving zone for opening said valve, a trip mechanism holding said valve open when moved to its open position against said biasing means, and means carried by said main frame and actuated by pivotal movement of said frame when said hopper is charged with the predetermined amount of material for releasing said trip mechanism thereby allowing said valve to reclose.

2. Apparatus as claimed in claim 1 in which said main frame comprises longitudinally extending channel members having their channels inwardly directed to form trackways and which further includes a sub-frame having bogies adapted to roll on said trackways, said hopper being mounted on said sub-frame.

3. Apparatus as claimed in claim 1 in which said hopper is movable to a position in the delivery zone in which it projects forwardly beyond said main frame, check means being provided on said main frame for supporting said hopper in its projecting position.

4. Apparatus as claimed in claim 1 in which the said counter-weight is adjustable along said main frame so as to enable variations to be made in the weight of material required to be fed into the hopper to effect tilting of such frame.

5. Apparatus as claimed in claim 1 in which said hopper is provided with an actuating handle in the form of a hoop circumscribing the said hopper and being slidably mounted so that it can be caused to project from either side of the hopper.

6. Apparatus as claimed in claim 1 and which further includes means for discharging the material from said hopper comprising a swingable base plate arranged to cover and uncover a discharge opening in the bottom of said hopper, and a handle extending over said hopper and adapted to be selectively connected to said movable plate so as to effect movement thereof to uncover said discharge opening pursuant to movement of said handle towards one side or the other of said hopper as may be desired.

7. Apparatus as claimed in claim 1 wherein said valve is mounted at the discharge opening of a silo, and said means mounting said main frame for pivotal movement include structure of said silo.

8. Apparatus as claimed in claim 1 in which said trip mechanism comprises slotted arms which move longitudinally in unison with the hopper as the latter approaches its receiving zone, the slots in said arms being disposed for cooperation with stationary means, and said means for releasing said trip mechanism comprises means for raising said arms and freeing said notches from said stationary means thereby permitting said arms and valve to relocate to their initial positions.

9. Apparatus as claimed in claim 8 in which the raising of said arms is effected by secondary arms cooperating with cams on said slotted arms, said secondary arms being pivotally mounted on said main frame and on a stationary part of the valve mechanism.

10. Apparatus as claimed in claim 1 wherein said main frame is pivotable towards and away from said valve so as to enable said frame to be swung upwardly into a nested position for storage and transport purposes.

11. Apparatus as claimed in claim 1 wherein said valve is mounted at the discharge opening of a silo and said means mounting said main frame for pivotal movement include structure of said silo, said main frame being swingable from an operating position in which it extends substantially horizontally from said silo into an inclined and nested position for transport or storage purposes.

12. Apparatus as claimed in claim 11 and which further includes supporting flexible connections provided between said silo and the delivery zone end portion of said main frame in order to support said main frame in its operating position.

13. Apparatus as claimed in claim 11 and which further includes means for securing said main frame in said nested position.

References Cited in the file of this patent

UNITED STATES PATENTS

| | | |
|---|---|---|
| 228,095 | Meyer | May 25, 1880 |
| 694,936 | Baker | Mar. 11, 1902 |
| 1,549,549 | Hoefken | Aug. 11, 1925 |
| 1,565,634 | Foote | Dec. 15, 1925 |

FOREIGN PATENTS

| | | |
|---|---|---|
| 309,438 | Germany | Nov. 16, 1918 |